US008850224B2

(12) United States Patent
Yang et al.

(10) Patent No.: US 8,850,224 B2
(45) Date of Patent: Sep. 30, 2014

(54) MEDIA-FOLLOWING ENCRYPTION POLICY CONTROL

(76) Inventors: Robert A. Yang, Greenwood Village, CO (US); Roderick B. Wideman, Shakopee, MN (US)

(*) Notice: Subject to any disclaimer, the term of this patent is extended or adjusted under 35 U.S.C. 154(b) by 547 days.

(21) Appl. No.: 12/646,376

(22) Filed: Dec. 23, 2009

(65) Prior Publication Data
US 2011/0154052 A1 Jun. 23, 2011

(51) Int. Cl.
*G06F 12/14* (2006.01)
*G11B 20/00* (2006.01)
*G06F 21/80* (2013.01)

(52) U.S. Cl.
CPC ...... *G11B 20/00731* (2013.01); *G11B 20/0026* (2013.01); *G11B 20/0021* (2013.01); *G11B 2220/20* (2013.01); *G11B 20/00876* (2013.01); *G11B 20/00275* (2013.01); *G06F 21/80* (2013.01); *G11B 2220/90* (2013.01); *G11B 20/00355* (2013.01); *G11B 2220/956* (2013.01); *G11B 20/00086* (2013.01)
USPC ...................................................... 713/189

(58) Field of Classification Search
CPC ............. G11B 20/00086; G11B 20/0021; G11B 20/0026; G11B 20/00275; G11B 20/00355; G11B 20/00731; G11B 20/00876
USPC ............. 713/189, 193; 726/1, 2, 20, 26, 27; 380/22
See application file for complete search history.

(56) References Cited

U.S. PATENT DOCUMENTS

| 6,201,474 | B1 | | 3/2001 | Brady et al. |
| 7,382,254 | B2 | * | 6/2008 | Posamentier ............... 340/572.1 |
| 7,414,805 | B1 | | 8/2008 | Ochs et al. |
| 2006/0101197 | A1 | * | 5/2006 | Georgis et al. ............... 711/111 |
| 2007/0028112 | A1 | * | 2/2007 | Mackelden et al. .......... 713/176 |
| 2007/0162687 | A1 | * | 7/2007 | Pua et al. ....................... 711/103 |
| 2007/0260891 | A1 | * | 11/2007 | Starr et al. .................... 713/193 |
| 2008/0063206 | A1 | * | 3/2008 | Karp et al. ..................... 380/277 |
| 2008/0065903 | A1 | * | 3/2008 | Goodman et al. ............ 713/193 |

FOREIGN PATENT DOCUMENTS

GB  2431249 A  *  4/2007

OTHER PUBLICATIONS

Press Release edited by StorageNewsletter.com on Sep. 25, 2008 entitled "B&L RFID Solution for Its Tape Management Products", 1 page.
Article entitled "Securing Sensitive Information: Securing Data With LTO-4 Tape Drive Encryption" printed from http://www.backupworks.com/lto-40tape-encryption.aspx on Oct. 29, 2009, 1 page.
"Sun Storage Tek T10000B Tape Drive Security Policy" for Part No. 316055101 (Revision: AB), from Sun Microsystems, Inc., dated Sep. 1, 2009, pp. 1-22.

* cited by examiner

*Primary Examiner* — Brandon Hoffman

(57) ABSTRACT

Example articles of manufacture, methods, and systems facilitate having encryption policy follow an article of manufacture like a tape cartridge. One example article of manufacture includes a media portion (e.g., tape) and a non-media portion (e.g., housing). The media portion is configured to store machine readable information. The article of manufacture could be a tape, a disk, a memory, and other computer readable media. The article of manufacture also includes an encryption policy information indicator. The encryption policy information indicator can be configured to store information that controls an encryption policy associated with the article of manufacture. Therefore, encryption policy can, for example, follow a tape cartridge rather than be resident solely in a controlling application (e.g., tape library).

15 Claims, 6 Drawing Sheets

MEDIA-FOLLOWING ENCRYPTION POLICY CONTROL

BACKGROUND

Conventionally, encryption policy for a removable media item (e.g., tape cartridge) has been applied at a high level by an application. This high level control has provided users with little, if any, control over whether a media item is encrypted without involving the application. Furthermore, it has typically been practically impossible to determine a tape encryption policy or a tape encryption state (e.g., encrypted, not encrypted) by looking at or otherwise physically examining a removable media item (e.g., tape cartridge) without placing the media item in a drive. While a tape drive is mentioned, one skilled in the art will appreciate that similar issues exist for other removable media (e.g., compact disk (CD), solid state disk (SSD)).

Tape drives can be configured to encrypt data written to a tape. Tape drives can also be configured to decrypt data read from a tape. The encrypting and decrypting can be performed at the hardware level of the tape drive. For example, an LTO-4 tape drive includes hardware based encryption/decryption capability in the tape drive itself. However, tape drives do not simply decide on their own to encrypt or decrypt. Encrypting and decrypting are controlled by policies and parameters. The policies control when a tape drive will encrypt and decrypt and how a tape drive will encrypt and decrypt (e.g., encryption algorithm). The parameters include, for example, an encryption key.

Conventionally, policy has been established by an external entity (e.g., tape library) as configured by a user. Conventionally, the external entity has interacted with a key manager. The external entity plus key manager model has created both challenges and limitations with respect to tape encryption management. Once again, while a tape drive is mentioned, one skilled in the art will appreciate that the external entity plus key manager model has created challenges for other removable media.

BRIEF DESCRIPTION OF THE DRAWINGS

The accompanying drawings, which are incorporated in and constitute a part of the specification, illustrate various example systems, methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
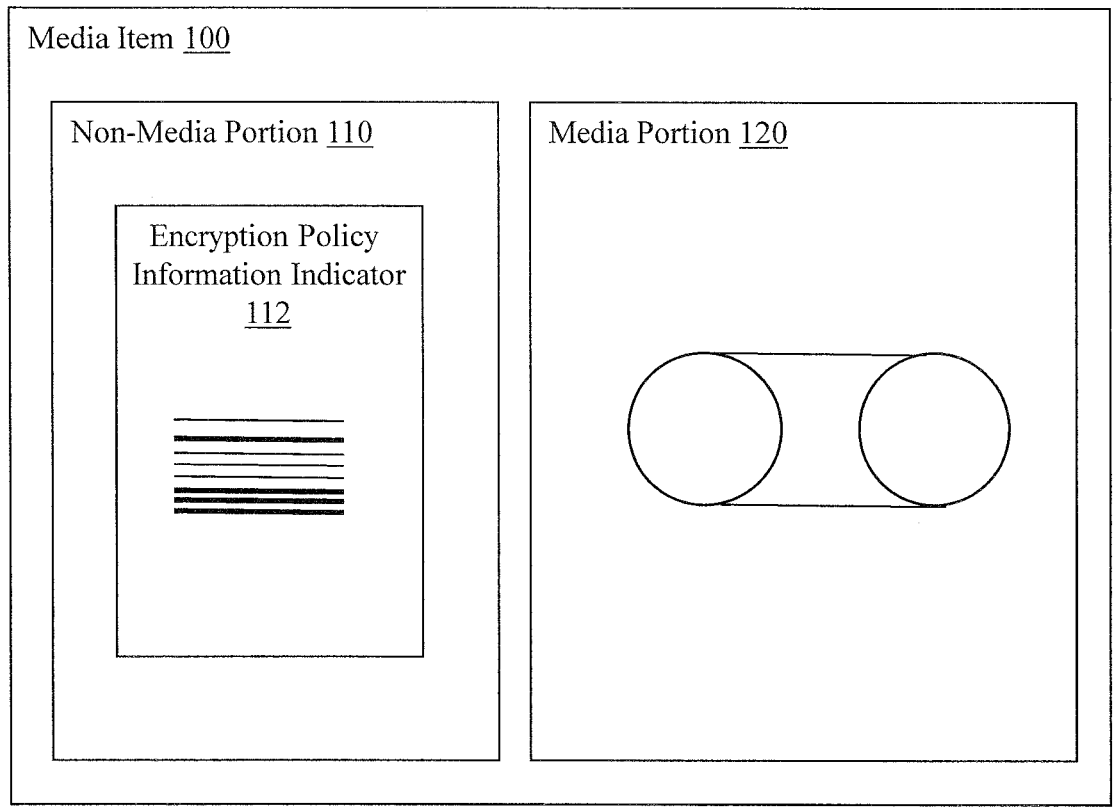
FIG. 1 illustrates an article of manufacture configured to facilitate media-following encryption policy control.

Example articles of manufacture, methods, and systems shift encryption policy from an external third party (e.g., tape library) that interacts with removable media items to the actual removable media items themselves. In one embodiment, articles of manufacture, methods, and systems can associate a physical semaphore with a removable media item to facilitate having encryption policy follow the removable media item. Example articles of manufacture, methods, and systems facilitate a user introducing a removable media item (e.g., tape cartridge) into an encryption capable device (e.g., tape drive) and having the encryption behavior follow the removable media item rather than be controlled solely by a high level application or other third party.

On-media identifiers have been used for other applications. For example, bar codes have been used to indicate a media type and generation. Similarly, tabs that can be opened or closed have been used on floppy disks to control whether a disk is read/write or read-only. However, these applications are not involved in associating encryption policy with a media item. Encryption policy has generally been controlled by an external entity and not associated with removable media items for different reasons. In one example, security related concepts like encryption and encryption policy have generally been considered to be the exclusive concern of control applications and security administrators, rather than something that can be distributed to media owners.

Example articles of manufacture, methods, and systems can control encryption policy based on a "physical semaphore" associated with a removable media item. One skilled in the art understands a semaphore to be a logical entity (e.g., value) that can be used to control the operation of an apparatus or process. From the computer science and computer engineering point of view, a semaphore may be a variable that restricts access to a shared resource (e.g., shared memory). The semaphore may have mutually exclusive values (e.g., locked, unlocked). Semaphores are used to prevent race conditions, to attempt to prevent resource deadlocks, and for other uses. The "physical semaphore" referred to herein relates to an identifiable piece of information that travels with a removable media item and that controls encryption policy.

The identifiable piece of information may be coded onto and/or into the removable media item in a variety of ways. For example, a tape cartridge may be configured with a bar code label that stores information identifying whether the tape cartridge is to be encrypted and/or decrypted. The bar code label could also store information about how the tape cartridge is to be encrypted and/or decrypted. The bar code could be configured to be both machine and human readable. Therefore a human could look at the tape cartridge and know whether the contents are encrypted. Additionally, a machine with a bar code reader could examine the tape cartridge to determine whether it is to be encrypted and/or decrypted and to determine other encryption policy information. This information could be made available to the human operating the bar code reader. In one example, a library can be configured with a bar code reader. A tape drive could be programmed to apply encryption policy based on information about the bar code that is provided to the tape drive by the library, the information having been provided to the library by the library bar code reader. In another example, a tape drive could be configured with the bar code reader rather than the library being configured with the bar code reader. The tape drive could then be programmed to apply encryption policy based on information about the bar code provided by the bar code reader. In different examples the tape drive could be programmed to apply the policy based on its own programming or in response to control information provided by an external entity (e.g., library) to which the tape drive provided the information about the bar code. One skilled in the art will appreciate that there is a historical hierarchy of devices and functions. For example a target tape drive can be a stand alone device or can be built into a server. An autoloader can be one tape drive with associated robotics for loading different tapes into the one tape drive. A tape library can have multiple target tape drives and associated robotics for loading different tapes into different drives. A grouped tape library can aggregate multiple table libraries and include the ability to pass tapes between libraries. Conventionally, automated bar code scanning may have been performed by an autoloader or by a tape library. However, one skilled in the art will appreciate that when the encryption behavior can follow a tape, that the location of the bar code reader will not necessarily control the ability to apply policy. Furthermore, one skilled in the art will appreciate that an independent bar code reader may be employed to examine a tape cartridge while it is outside a tape drive, an autoloader, or a library.

While a bar code has been described above, one skilled in the art will appreciate that there are other ways to store the encryption policy information so that it travels with the removable media item. For example, a tape cartridge may be notched to indicate policy. The notch could be humanly readable and machine readable. The notch could either block light or allow light to pass through the removable media item. Additionally and/or alternatively, the notch could activate or deactivate a mechanical and/or electrical switch in a drive. While a notch is described, one skilled in the art will appreciate that other physical features (e.g., texture, color) could encode encryption policy. In different embodiments, a physical feature like a notch or tab can be fixed or can be configurable. For example, a notch may have a sliding tab that can change the size and/or shape of the notch. Therefore the removable media item may be encoded with information concerning as many different encryption policies as there are tab positions on the removable media item.

As described above, a removable media item can store encryption policy controlling information on a bar code and/or in a physical feature (e.g., notch, tab position). In other embodiments, a removable media item can also store encryption policy information in other ways. For example, a tape cartridge can include a memory separate from the tape media. By way of illustration, an LTO-4 tape cartridge can be configured with an 8 k memory. The 8 k memory can be programmed to store information about the cartridge and its usage. In one embodiment, encryption policy information could be coded into the 8 k memory. While an LTO-4 cartridge and an 8 k memory are described, one skilled in the art will appreciate that other removable media may be configured with other programmable and/or read-only memories.

A removable media item may also use a portion of its storage area to store encryption policy information. For example, a tape cartridge can use a portion of its header to store encryption policy information. In this embodiment, the encryption policy may not be physically viewable by a user and may not be directly controllable by a user like a tab or bar code label is controllable by a user. However, the encryption policy information can still travel with the removable media item. While a tape header is described, one skilled in the art will appreciate that other removable media items (e.g., disks, CDs, solid state drives) could use different portions of their useable space to store encryption policy information.

A removable media item may also be configured with other media that stores encryption policy information. For example, a removable radio frequency identification (RFID) label can be added/removed by a user to control encryption policy. The RFID label may be color coded to be human readable. The RFID label may store encryption policy information that can be read by a handheld RFID reader to provide information to a user. This is similar to the model employed by a bar code reader. The RFID label may also store encryption policy information that can be read by an RFID reader associated with a tape drive to provide the encryption policy information to the tape drive. While an RFID label is described, one skilled in the art will appreciate that other externally fixable items that can be configured to store encryption policy information can be applied to a removable media item.

In different embodiments (e.g., notch, header information, RFID label, memory), example articles of manufacture, methods, and systems are configured so that encryption policy behavior is associated with a removable media item and follows the removable media item. For example, a tape cartridge is configured with encryption policy information that controls whether a tape is encrypted and, if so, how the tape cartridge is encrypted.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

FIG. 1 illustrates an article of manufacture configured to facilitate media-following encryption policy control. The article of manufacture can be, for example, a media item 100. The media item 100 can be a removable machine readable media item. The media item 100 can be, for example, a tape, a tape cartridge, a disk, a compact disk (CD), a drive, a solid state drive (SSD), a hard drive, a universal serial bus (USB) drive, a solid state cartridge, a memory stick, and a memory card. Being removable means that the media item can be physically associated with and physically dis-associated with a machine that reads and/or writes the media item. For example, a tape cartridge can be inserted into and ejected from a tape drive. Similarly, a CD can be inserted into and removed from a CD drive.

The media item 100 includes a media portion 120 and a non-media portion 110. The media portion 120 is configured to store machine readable information. In a tape cartridge, the media portion 120 is the physical tape. In a spinning disk, the media portion 120 is the readable/writable platter(s). The non-media portion 110 includes, for example, a housing, a case, a carrier, and other parts that are not the media portion 120.

The media item 100 stores an encryption policy information indicator 112. The encryption policy information indicator 112 is configured to store information to control an encryption policy associated with the removable machine readable media item 100. This policy can control how and/or whether data stored on the media portion 120 will be encrypted and/or decrypted. In different embodiments the encryption policy indicator 112 can be a notch in a housing of the removable machine readable media item 100, a tab on the housing of the removable machine readable media item 100, a label affixed to the removable machine readable media item 100, a radio frequency identification (RFID) tag affixed to the removable machine readable media item 100, a texture of the non-media portion 110, and a color of the non-media portion 110. One skilled in the art will appreciate that the encryption policy information indicator 112 may be stored using these approaches, combinations of these approaches, and other approaches.

In FIG. 1, the media item 100 is illustrated as a tape cartridge. In FIG. 1, the encryption policy indicator 112 is illustrated as a bar code label affixed to the tape cartridge. While a bar code label affixed to a tape cartridge is illustrated, tape cartridges can be configured to store the encryption policy indicator 112 in other ways. For example, when the media item 100 is a tape cartridge, the encryption policy indicator 112 can be, but is not limited to being, a notch in the housing of the tape cartridge, a tab on the housing of the tape cartridge, a label affixed to the tape cartridge, and a radio frequency identification (RFID) tag affixed to the tape cartridge.

In different embodiments the encryption policy indicator 112 can be user configurable. For example, a user may print a bar code label and affix the bar code label to the tape cartridge. In another example, a user may select an RFID tag from a set of available RFID tags and affix it to the tape cartridge. In another embodiment a user may open or close a sliding window on the tape cartridge. In some embodiments (e.g., bar code label, sliding window), a value stored by the encryption policy indicator is directly user discernible through human senses including, for example, the sense of touch, and the sense of sight.

In one embodiment, the encryption policy indicator 112 is not associated with the non-media portion 110 but is instead associated with the media portion 120. For example, when the media portion 120 is a tape, the encryption policy indicator 112 may be written in a header on the tape. While a tape and a tape header are described, one skilled in the art will appreciate that other physical locations (e.g., boot record) on other physical media (e.g., disk) may store the encryption policy indicator 112.

Figure 2:
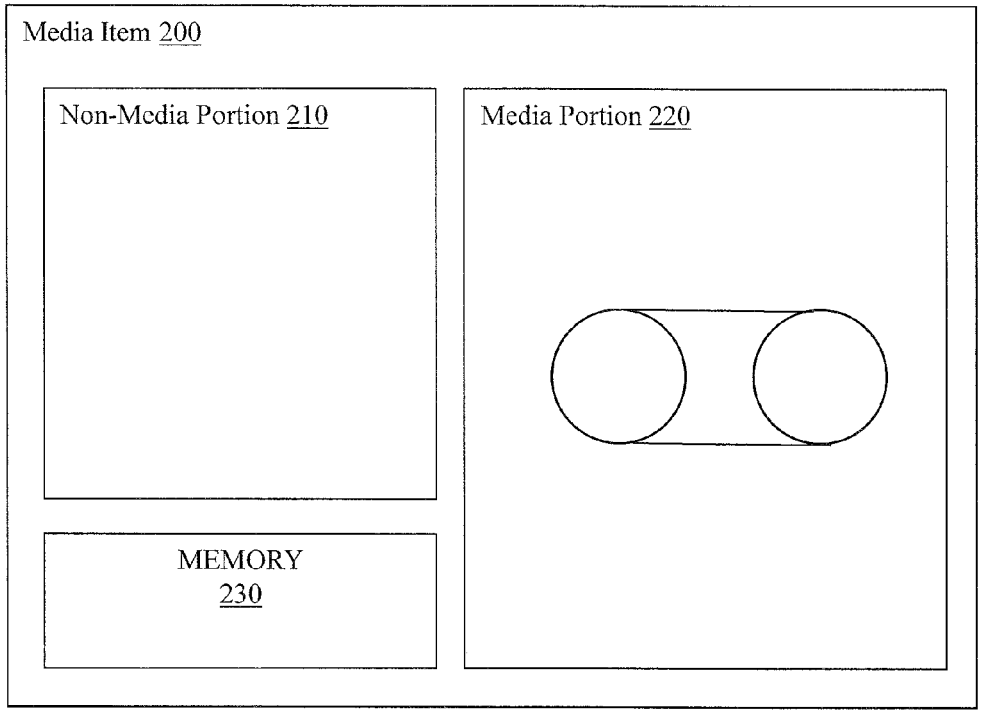
FIG. 2 illustrates an article of manufacture configured to facilitate media-following encryption policy control.

FIG. 2 illustrates an article of manufacture configured to facilitate media-following encryption policy control. In FIG. 2, a media item 200 includes a non-media portion 210 (e.g., housing) and a media portion 220 (e.g., tape). Media item 200 also includes a computer readable memory 230. The computer readable memory 230 is distinct from the media portion 220. For example, a tape cartridge can include a random access memory chip. In FIG. 2, the encryption policy control indicator is stored in the computer readable memory 230. The computer readable memory 230 may be read, for example, by a drive into which the media item 200 is inserted, by a special purpose machine configured to read memory 230, and other devices. Where encryption policy information indicator 112 (FIG. 1) may have been user readable when embodied as, for example, a bar code label, the encryption policy control indicator stored in memory 230 may not be directly humanly readable using only human senses.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 3:
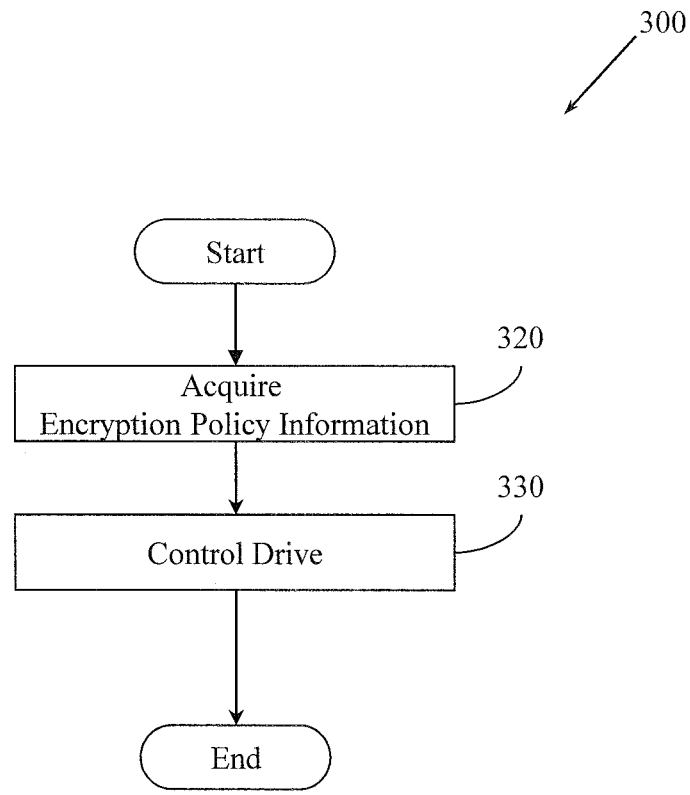
FIG. 3 illustrates a method associated with facilitating media-following encryption policy control.

FIG. 3 illustrates a method 300 associated with facilitating media-following encryption policy control. Method 300 includes, at 320, acquiring encryption policy information from a portable computer readable medium. Method 300 also includes, at 330, automatically controlling a drive with respect to encryption policy for the portable computer readable medium. The control exercised at 330 will be based on the encryption policy information. The drive is configured to read and/or write the portable computer readable medium and to selectively apply encryption and decryption to data stored on the portable computer readable medium according to an encryption policy. Conventionally, the encryption policy has been controlled by information not stored on the portable computer readable medium.

In different examples, acquiring encryption policy information from the portable computer readable medium at 320 includes, but may not be limited to, analyzing a notch on the portable computer readable medium, analyzing a tab position on the portable computer readable medium, reading the encryption policy information from the portable computer readable medium, reading the encryption policy information from a memory coupled to the portable computer readable medium, reading the encryption policy information from a label affixed to the portable computer readable medium, analyzing a color of the portable computer readable medium, and analyzing a texture of the portable computer readable medium. Analyzing the notch may include, for example, determining whether the notch indicates that encryption/decryption are to be applied and, if so, in what manner (e.g., according to what algorithm).

A drive may include hardware and/or processes that are directly controllable based on the information stored on the portable computer readable medium. Therefore, in one example, automatically controlling the drive at 330 includes controlling an encryption policy logic on the drive based on the encryption policy information. However, a drive may not include hardware and/or processes that are directly controllable based on information stored on the portable computer readable medium. In this example, automatically controlling the drive at 330 can include controlling the drive to provide the encryption policy information to an external encryption policy control unit and then controlling the drive as a function of information returned from the external encryption policy control unit.

In one embodiment, the portable computer readable medium is a tape cartridge and the drive is a tape drive. In this example, acquiring encryption policy information from the tape cartridge at 320 includes, but may not be limited to, reading from a memory housed in the tape cartridge, reading a bar code label on the tape cartridge, and reading a header from the tape in the tape cartridge. In this embodiment, automatically controlling the tape drive at 330 can include controlling the tape drive to selectively perform encryption functions on the tape cartridge as a function of the encryption policy information.

In one example, a method may be implemented as computer executable instructions. Thus, in one example, a computer-readable medium may store computer executable instructions that if executed by a computer (e.g., disaster recovery server) cause the computer to perform method 300. While executable instructions associated with the method 300 are described as being stored on a computer-readable medium, it is to be appreciated that executable instructions associated with other example methods described herein may also be stored on a computer-readable medium.

Figure 4:
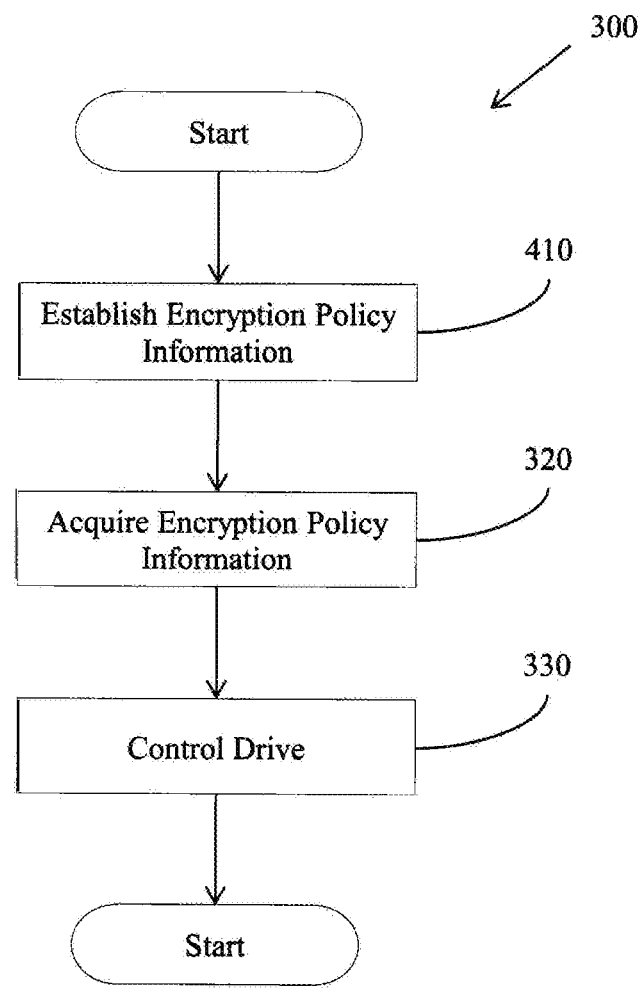
FIG. 4 illustrates a method associated with facilitating media-following encryption policy control.

FIG. 4 illustrates another embodiment of method 300. This embodiment includes, at 410, establishing the encryption policy information on the portable computer readable medium. In different embodiments, establishing the encryption information on the portable computer readable medium at 410 includes, but may not be limited to, establishing a notch on the portable computer readable medium, positioning a tab on the portable computer readable medium, writing the encryption policy information to the portable computer readable medium, writing the encryption policy information to a memory coupled to the portable computer readable medium, affixing a label to the portable computer readable medium, configuring a label on the portable computer readable medium, establishing a color for the portable computer readable medium, and establishing a texture for the portable computer readable medium.

In one embodiment, the portable computer readable medium is a tape cartridge and the drive is a tape drive. In this example, configuring the tape cartridge at 410 can include, but may not be limited to, writing to a memory housed in the tape cartridge, configuring a bar code label associated with the tape cartridge, and writing a header to a tape in the tape cartridge. One skilled in the art will appreciate that other portable computer readable media (e.g., CD, drive) may be configured in different ways to facilitate having encryption policy control physically associated with the media.

Figure 5:
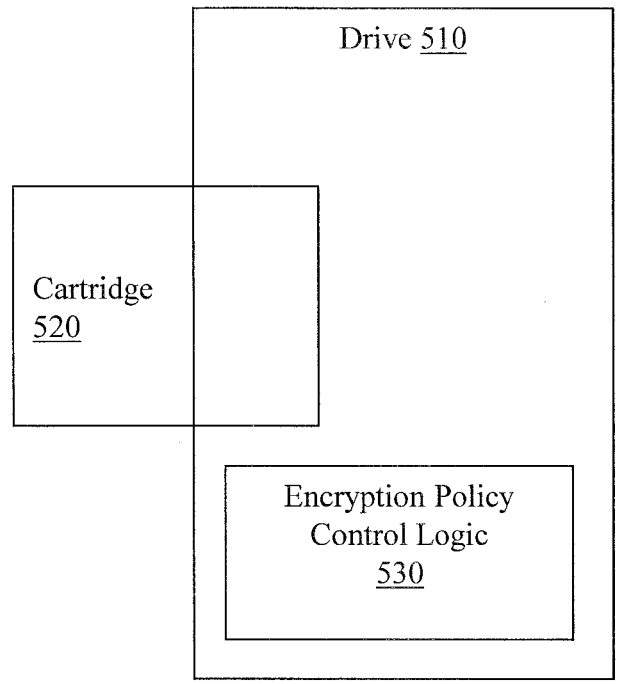
FIG. 5 illustrates a drive configured to have encryption policy controlled internally based on information associated with the removable media item.

FIG. 5 illustrates a drive 510 configured to have encryption policy controlled internally by information associated with a removable media item. In FIG. 5, the removable media item is a cartridge 520 inserted into drive 510. The cartridge 520 may have been processed by a machine to configure it with encryption policy control information and/or may have been configured by a human to store encryption policy control information. Thus, one example system may include means (e.g., hardware, circuits, software in execution) for physically locating encryption policy control in a computer readable medium. The encryption policy controls, for example, whether data on the tape cartridge 520 will be encrypted, how data on the tape cartridge 520 will be encrypted, whether data on the tape cartridge 520 will be decrypted, and how data on the tape cartridge 520 will be decrypted.

Drive 510 includes an encryption policy control logic 530. The logic 530 may be controllable directly from information stored on cartridge 520. In this example, logic 530 provides means (e.g., hardware, circuits, software in execution) for controlling encryption policy for the tape cartridge 520 based, at least in part, on the encryption policy control information. While a drive 510 and a tape cartridge 520 are illustrated, one skilled in the art will appreciate that other drives and media can be similarly configured and processed.

Figure 6:
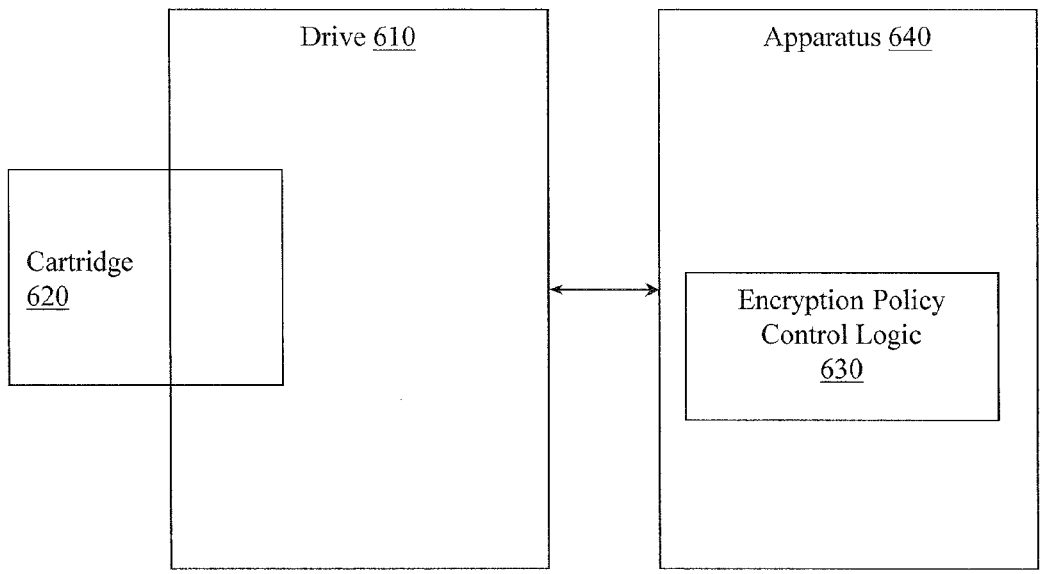
FIG. 6 illustrates a drive configured to have encryption policy controlled externally based on information associated with the removable media item.

FIG. 6 illustrates a drive 610 configured to have encryption policy controlled externally based on information associated with a removable media item. In FIG. 6, the removable media item is a cartridge 620 inserted into drive 610. The cartridge 620 may have been processed by a machine to configure it with encryption policy control information and/or may have been configured by a human to store encryption policy control information. The encryption policy controls, for example, whether data on the tape cartridge 620 will be encrypted, how data on the tape cartridge 620 will be encrypted, whether data on the tape cartridge 620 will be decrypted, and how data on the tape cartridge 620 will be decrypted.

Drive 610 does not include encryption policy control logic 630. Instead, encryption policy control logic 630 resides in a separate apparatus 640. In this example, the logic 630 may be controllable from information stored on cartridge 620. The information would be read by drive 610 and provided to apparatus 640. In another example, the information could be read by apparatus 640 and provided to drive 610. Logic 630 could then control drive 610 based on the information.

While example articles of manufacture, methods, and systems have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. An article of manufacture, comprising:
a removable machine readable media item comprising a media portion and a non-media portion, where the media portion stores machine readable information; and
an encryption policy information indicator that stores information to control an apparatus to perform an encryption policy associated with the removable machine readable media item;
where the article of manufacture is used with an apparatus that selectively encrypts or decrypts the machine readable information as controlled by the encryption policy and an encryption key, the encryption policy and the encryption key being separate items,
where the encryption policy information indicator is a notch in a housing of the removable machine readable media item, or a texture on the housing of the removable machine readable media item, where the encryption policy indicator controls a time at which machine readable information stored on the media portion is to be encrypted by the apparatus, where the encryption policy indicator controls how machine readable information stored on the media portion is to be encrypted by the apparatus, where the encryption policy indicator controls a time at which machine readable information stored on the media portion is to be decrypted by the apparatus, and where the encryption policy indicator controls how machine readable information stored on the media portion is to be decrypted by the apparatus.

2. The article of manufacture of claim 1, the apparatus being a tape drive, and where the encryption policy indicator directly controls hardware in the tape drive, where the hardware in the tape drive executes the encryption policy.

3. The article of manufacture of claim 1, where the removable machine readable media item is one of, a tape, a tape cartridge, a disk, a compact disk (CD), a drive, a solid state drive (SSD), a hard drive, a universal serial bus (USB) drive, a solid state cartridge, a memory stick, and a memory card.

4. The article of manufacture of claim 1, where the encryption policy indicator is user configurable.

5. The article of manufacture of claim 1, where a value stored by the encryption policy indicator is directly user discernible through the sense of touch or the sense of sight.

6. The article of manufacture of claim 1, where the encryption policy indicator is machine readable information encoded on the media portion.

7. The article of manufacture of claim 1, where the encryption policy information indicator is provided to an external encryption policy control unit that executes the encryption policy.

8. The article of manufacture of claim 1, where the encryption policy indicator controls how machine readable information stored on the media portion is to be encrypted by the apparatus by providing information identifying an algorithm to be used for encrypting the machine readable information.

9. The article of manufacture of claim 1, where the encryption policy indicator controls how machine readable information stored on the media portion is to be decrypted by the apparatus by providing information identifying an algorithm to be used for decrypting the machine readable information.

10. A method, comprising:

acquiring encryption policy information from a portable computer readable medium, where the portable computer readable medium comprises an encryption policy information indicator that stores information to control an apparatus to perform an encryption policy associated with the portable computer readable medium; and automatically controlling a drive with respect to encryption policy for the portable computer readable medium based on the encryption policy information and on an encryption key, the drive being configured to read and write the portable computer readable medium, where automatically controlling the drive comprises selectively encrypting or decrypting data on the portable computer readable medium as a function of the encryption policy information and an encryption key, the encryption policy information and the encryption key being separate items, where the encryption policy information controls a time at which data stored on the computer readable medium is to be encrypted by the drive, where the encryption policy information controls how data stored on the computer readable medium is to be encrypted by the drive, where the encryption policy information controls a time at which data stored on the computer readable medium is to be decrypted by the drive, where the encryption policy information controls how data stored on the computer readable medium is to be decrypted by the drive.

11. The method of claim 10, comprising:

establishing the encryption policy information on the portable computer readable medium.

12. The method of claim 11, where establishing the encryption policy information on the portable computer readable medium includes establishing a notch on the portable computer readable medium, or establishing a texture for the portable computer readable medium.

13. The method of claim 12, where acquiring the encryption policy information from the portable computer readable medium comprises analyzing a notch on the portable computer readable medium, or analyzing a texture of the portable computer readable medium.

14. The method of claim 10, where automatically controlling the drive with respect to encryption policy for the portable computer readable medium based on the encryption policy information comprises controlling an encryption policy logic on the drive based on the encryption policy information.

15. The method of claim 10, where the portable computer readable medium is a tape cartridge, where the drive is a tape drive, where configuring the tape cartridge with the encryption policy information comprises configuring a notch in the housing of the tape cartridge, or configuring a texture on the housing of the tape cartridge, where acquiring the encryption policy information from the tape cartridge comprises one or more of, reading from the notch, and reading from the texture, and where automatically controlling the tape drive with respect to encryption policy for the tape cartridge based on the encryption policy information comprises controlling the tape drive to selectively perform encryption functions on the tape cartridge as a function of the encryption policy information.

* * * * *

UNITED STATES PATENT AND TRADEMARK OFFICE
CERTIFICATE OF CORRECTION

| | | |
|---|---|---|
| PATENT NO. | : 8,850,224 B2 | Page 1 of 1 |
| APPLICATION NO. | : 12/646376 | |
| DATED | : September 30, 2014 | |
| INVENTOR(S) | : Yang et al. | |

It is certified that error appears in the above-identified patent and that said Letters Patent is hereby corrected as shown below:

On the Title Page item (56)

Column 2, line 24, delete "backupworks.com/Ito-40tape-encryption.aspx" and insert --backupworks.com/lto-40tape-encryption.aspx--.

In the Specification

In Column 3, line 51, delete "an 8 k memory. The 8 k memory can" and insert --an 8k memory. The 8k memory can--.

In Column 3, line 54, delete "the 8 k memory." and insert --the 8k memory.--.

In Column 3, line 55, delete "an 8 k memory" and insert --an 8k memory--.

Signed and Sealed this
Thirtieth Day of December, 2014

Michelle K. Lee
*Deputy Director of the United States Patent and Trademark Office*